T. J. PRICE.
FRUIT-PRESERVING JAR.

No. 171,044. Patented Dec. 14, 1875.

WITNESSES.
J. M. Price
A. Fisher

INVENTOR.
Thos. J. Price

UNITED STATES PATENT OFFICE.

THOMAS J. PRICE, OF MACOMB, ILLINOIS.

IMPROVEMENT IN FRUIT PRESERVING-JARS.

Specification forming part of Letters Patent No. 171,044, dated December 14, 1875; application filed March 24, 1874.

*To all whom it may concern:*

Be it known that I, THOMAS J. PRICE, of Macomb, in the county of McDonough and State of Illinois, have invented a new and useful Improvement in Fruit-Jars; and I do hereby declare that the following is a full, clear, and exact description, which will enable others skilled in the art to make and use the same, reference being had to the annexed drawings, in which—

Figure 1:
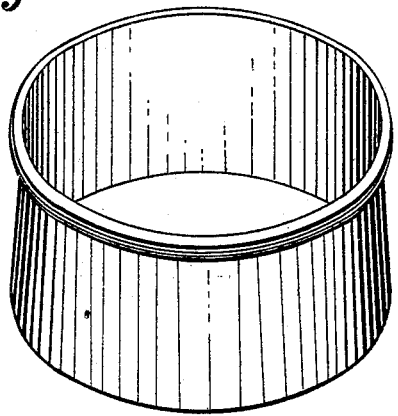
Figure 2:
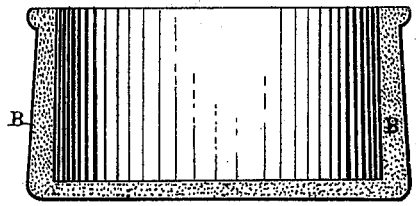

Figure 1 is a perspective view, and Fig. 2 is a cross-section of the same, showing the porous body.

This invention has for its object the preparation of a porous fruit jar or vessel so that it will preserve grapes on their clusters, and other green fruits, and keep them fresh through the winter; and its novelty consists in filling the pores of a porous fruit jar or vessel with salt (chloride of sodium) in solution, and lining the inside with lime.

The jars are constructed out of potters clay in the usual manner of constructing common earthenware, and then baked in a kiln sufficient to make a durable ware without any substance applied to them to form a glaze. When they are thus made the body of the jar is porous, as shown in Fig. 2. They are then placed in a bath-tub containing a strong salt solution. They remain in the bath a sufficient length of time to fill the pores in the jars with the salt solution. The jars are then taken out and allowed to dry. They are then lined on the inside with lime, which is made in a plastic state with water, and applied to the inside of the jar in any convenient manner.

The object of filling the pores of a porous fruit-jar with a salt solution is to produce a cold and even temperature inside of the jar, as the jars when thus prepared will absorb moisture from the air sufficient to keep the body of the jar in a damp, moist state, which moisture and salt in the pores of the jar produces the cold and even temperature inside of the jar, and also supplies the fruit with sufficient moisture to keep it from wilting.

The object of lining the inside of the jar with lime is to prevent any mold or fungous matter from germinating on the fruit. After the jars are carefully filled with the clusters of grapes or other fruit that is wanted for winter use, they are placed in the cellar or basement, where they will not freeze, and stacked on top of each other in tiers to a convenient height—the jars being constructed with the top and bottom the same size for that purpose. Whenever the fruit is wanted for use the jars are set off of each other, and when the amount of fruit is secured the jars are then set back to their places again.

Having thus fully described my invention, what I claim as new, and desire to secure by Letters Patent, is—

A porous fruit-jar, saturated with a solution of salt, and lined on the inside with lime, substantially as and for the purpose set forth.

THOS. J. PRICE.

Witnesses:
    J. M. PRICE,
    A. FISHER.